US010138799B2

(12) United States Patent
Tozzi et al.

(10) Patent No.: US 10,138,799 B2
(45) Date of Patent: Nov. 27, 2018

(54) TWO-STAGE PRECOMBUSTION CHAMBER FOR LARGE BORE GAS ENGINES

(71) Applicant: Prometheus Applied Technologies, LLC, Fort Collins, CO (US)

(72) Inventors: Luigi P. Tozzi, Fort Collins, CO (US); Maria Emmanuella Sotiropoulou, Fort Collins, CO (US); David Thomas Lepley, Girard, OH (US)

(73) Assignee: Prometheus Applied Technologies, LLC, Fort Collins, CO (US)

( * ) Notice: Subject to any disclaimer, the term of this patent is extended or adjusted under 35 U.S.C. 154(b) by 1078 days.

(21) Appl. No.: 14/020,770

(22) Filed: Sep. 6, 2013

(65) Prior Publication Data

US 2014/0060479 A1    Mar. 6, 2014

Related U.S. Application Data

(60) Provisional application No. 61/697,628, filed on Sep. 6, 2012.

(51) Int. Cl.
*F02B 19/12* (2006.01)
*F02B 19/10* (2006.01)
(Continued)

(52) U.S. Cl.
CPC ............ *F02B 19/1095* (2013.01); *F02B 1/04* (2013.01); *F02B 17/005* (2013.01);
(Continued)

(58) Field of Classification Search
CPC .. F02B 23/04; F02B 23/0675; F02B 23/0672; F02B 19/12; F02B 19/10; F02B 19/08;
(Continued)

(56) References Cited

U.S. PATENT DOCUMENTS 1,422,794 A * 7/1922 Smith ................. F02B 19/1004
123/143 B
1,633,384 A * 6/1927 Lucke ..................... F02B 19/14
123/275
(Continued)

FOREIGN PATENT DOCUMENTS

WO    2012091739 A2    7/2012

OTHER PUBLICATIONS

PCT International Search Report of International Application No. PCT/US2013/058635 filed on Sep. 6, 2013. 16 Pages.
(Continued)

*Primary Examiner* — Mahmoud Gimie
(74) *Attorney, Agent, or Firm* — Barcelo, Harrison & Walker LLP

(57) ABSTRACT

In certain embodiments, a two-stage precombustion chamber may be used to reduce engine NOx levels, with fueled precombustion chambers, while maintaining comparable engine power output and thermal efficiency. One or more fuel admission points may be located in either the first prechamber stage or the second prechamber stage. A more efficient overall combustion characterized by low levels of NOx formation may be achieved by a two-stage precombustion chamber system while generating very high energy flame jets emerging from the second prechamber stage into the main combustion chamber. A first prechamber stage may be substantially smaller than a second prechamber stage. The volumes and aspect ratios of the two prechamber stages, along with the location of the electrodes within the first stage prechamber, the holes patterns, angles and the separate fueling, may be selected to create a distribution of fuel concentration that is substantially higher in the first stage prechamber compared to the second prechamber stage.

42 Claims, 13 Drawing Sheets

2-Stage Precombustion Chambers

(51) Int. Cl.
*F02B 23/04* (2006.01)
*F02B 23/06* (2006.01)
*F02B 17/00* (2006.01)
*F02B 1/04* (2006.01)
*F02B 19/16* (2006.01)
*H01T 13/54* (2006.01)
*F02B 19/00* (2006.01)

(52) U.S. Cl.
CPC ........ *F02B 19/108* (2013.01); *F02B 19/1009* (2013.01); *F02B 19/1014* (2013.01); *F02B 19/12* (2013.01); *F02B 19/16* (2013.01); *F02B 23/04* (2013.01); *F02B 23/0672* (2013.01); *F02B 23/0675* (2013.01); *H01T 13/54* (2013.01); *Y02T 10/125* (2013.01)

(58) Field of Classification Search
CPC ........ F02B 19/16; F02B 19/165; F02B 19/18; F02B 19/108; F02B 19/1095; F02B 17/005; F02B 1/04
USPC ....... 123/256, 260, 261, 267, 275, 281–284, 123/291, 293
See application file for complete search history.

(56) References Cited

U.S. PATENT DOCUMENTS

| | | | | |
|---|---|---|---|---|
| 1,660,424 A * | 2/1928 | Modersohn | ............. | F02B 19/14 123/275 |
| 1,877,737 A * | 9/1932 | Goldberg | ................ | F02B 19/14 123/256 |
| 2,456,080 A * | 12/1948 | Wu Pe | ................... | F23Q 7/001 123/143 A |
| 2,991,768 A * | 7/1961 | Witzky | ..................... | F02B 3/00 123/256 |
| 4,124,000 A * | 11/1978 | Genslak | ................. | F02B 3/00 123/256 |
| 4,174,679 A * | 11/1979 | Noguchi | ................. | F02B 19/12 123/263 |
| 4,218,993 A * | 8/1980 | Blackburn | .......... | F02B 19/1095 123/143 B |
| 4,696,269 A * | 9/1987 | Blackburn | .............. | F02B 19/12 123/256 |
| 5,060,609 A * | 10/1991 | Merritt | .................... | F02B 33/14 123/256 |
| 5,222,993 A * | 6/1993 | Crane | ..................... | F02B 19/12 123/256 |
| 8,839,762 B1 * | 9/2014 | Chiera | ................. | F02B 19/108 123/256 |
| 2006/0219210 A1 | 10/2006 | Bailey | | |
| 2007/0069617 A1 | 3/2007 | Tozzi et al. | | |
| 2009/0309475 A1 | 12/2009 | Tozzi | | |
| 2011/0108012 A1 | 5/2011 | Bryant | | |
| 2012/0125287 A1 | 5/2012 | Chiera | | |
| 2013/0055986 A1 * | 3/2013 | Tozzi | ..................... | F02B 19/12 123/254 |
| 2014/0102404 A1 * | 4/2014 | Sotiropoulou | ...... | F02B 19/1014 123/260 |

OTHER PUBLICATIONS

European Search Report of European Application No. 13835622 dated Jul. 27, 2015. 7 Pages.

* cited by examiner

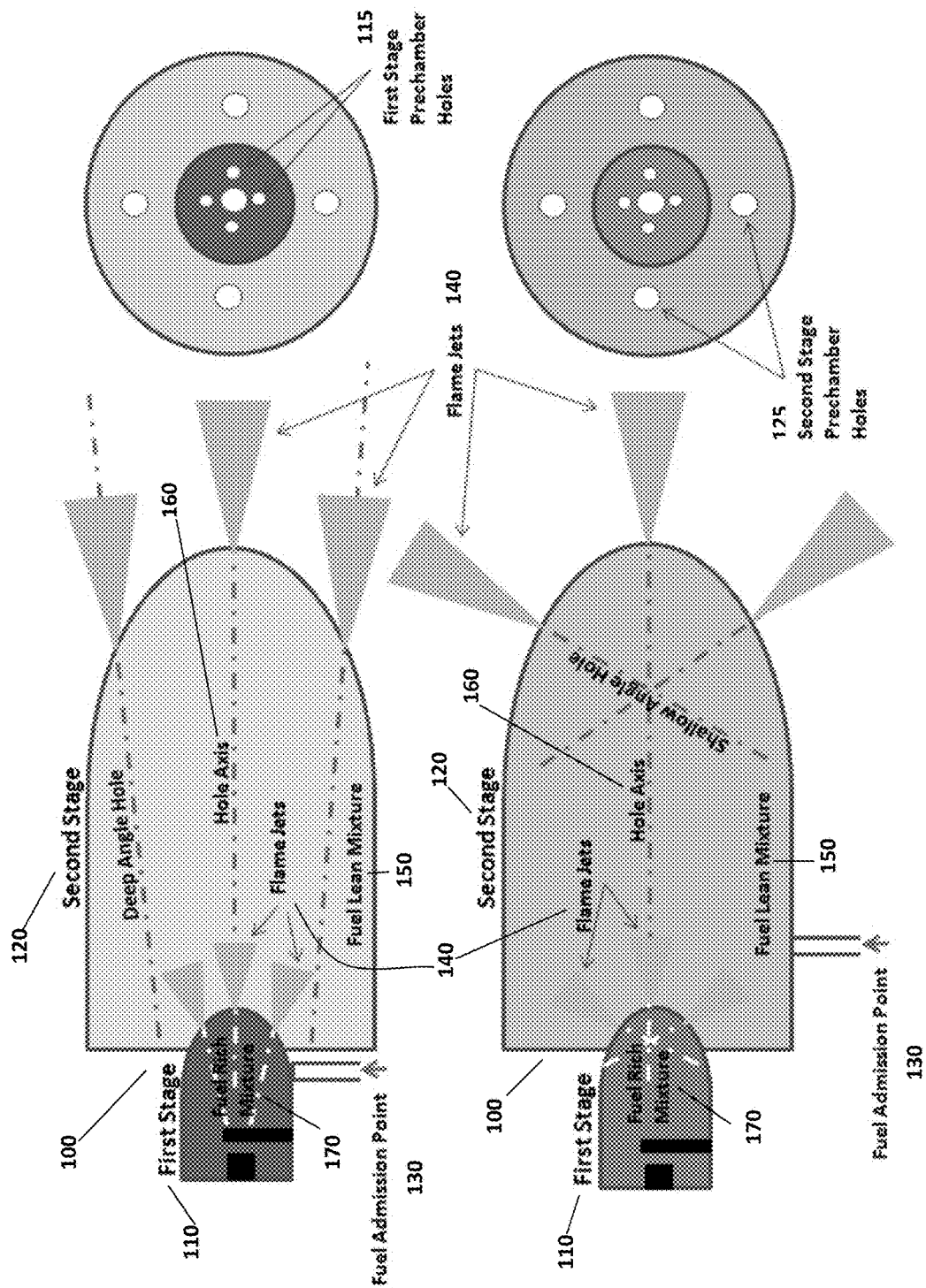
Figure 1 2-Stage Precombustion Chambers

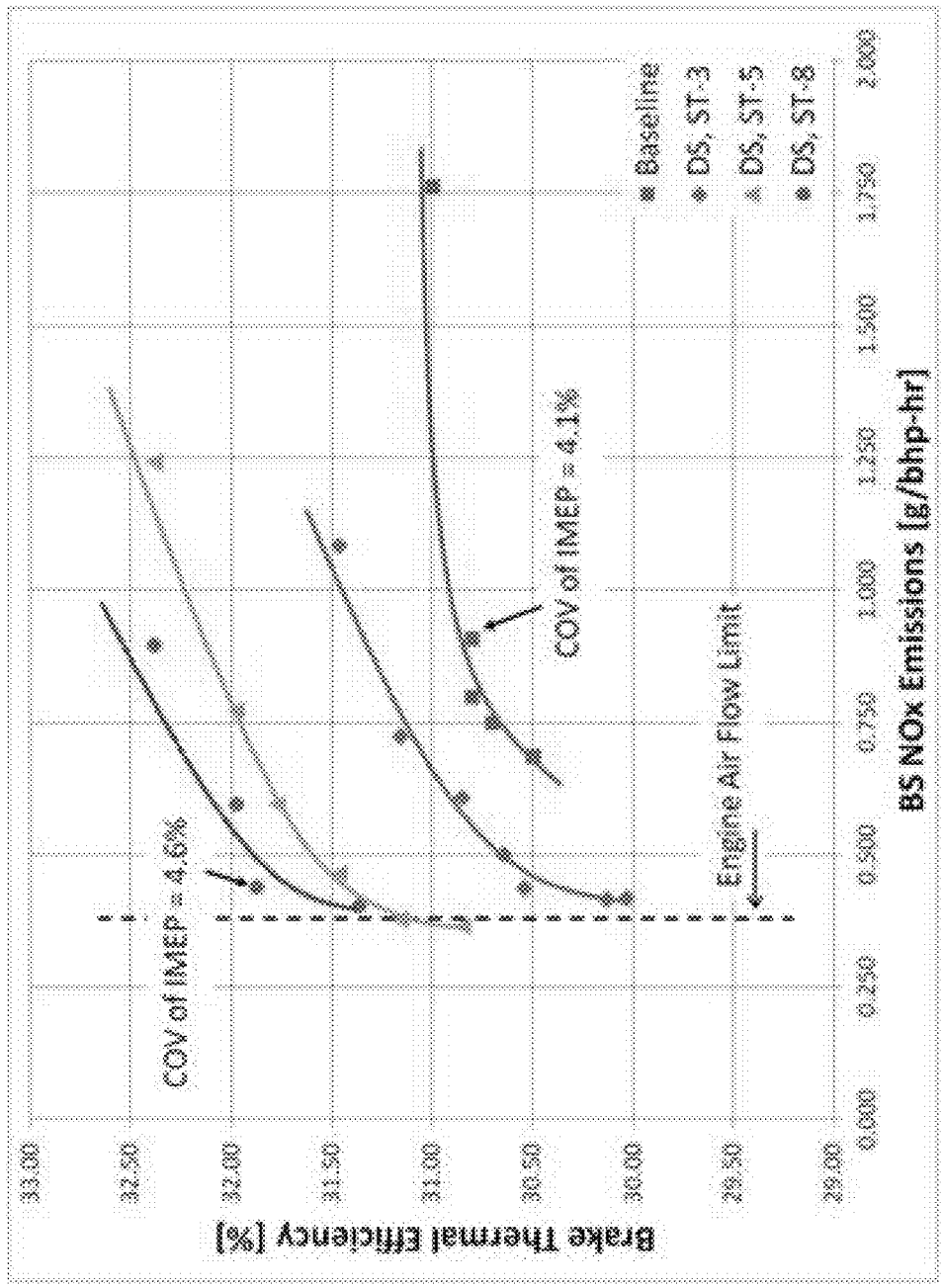
Figure 2. 500hp – BTE/NOx trade-off comparison of the Conventional precombustion chamber (Baseline) and the Dual Stage Prechamber (DS)

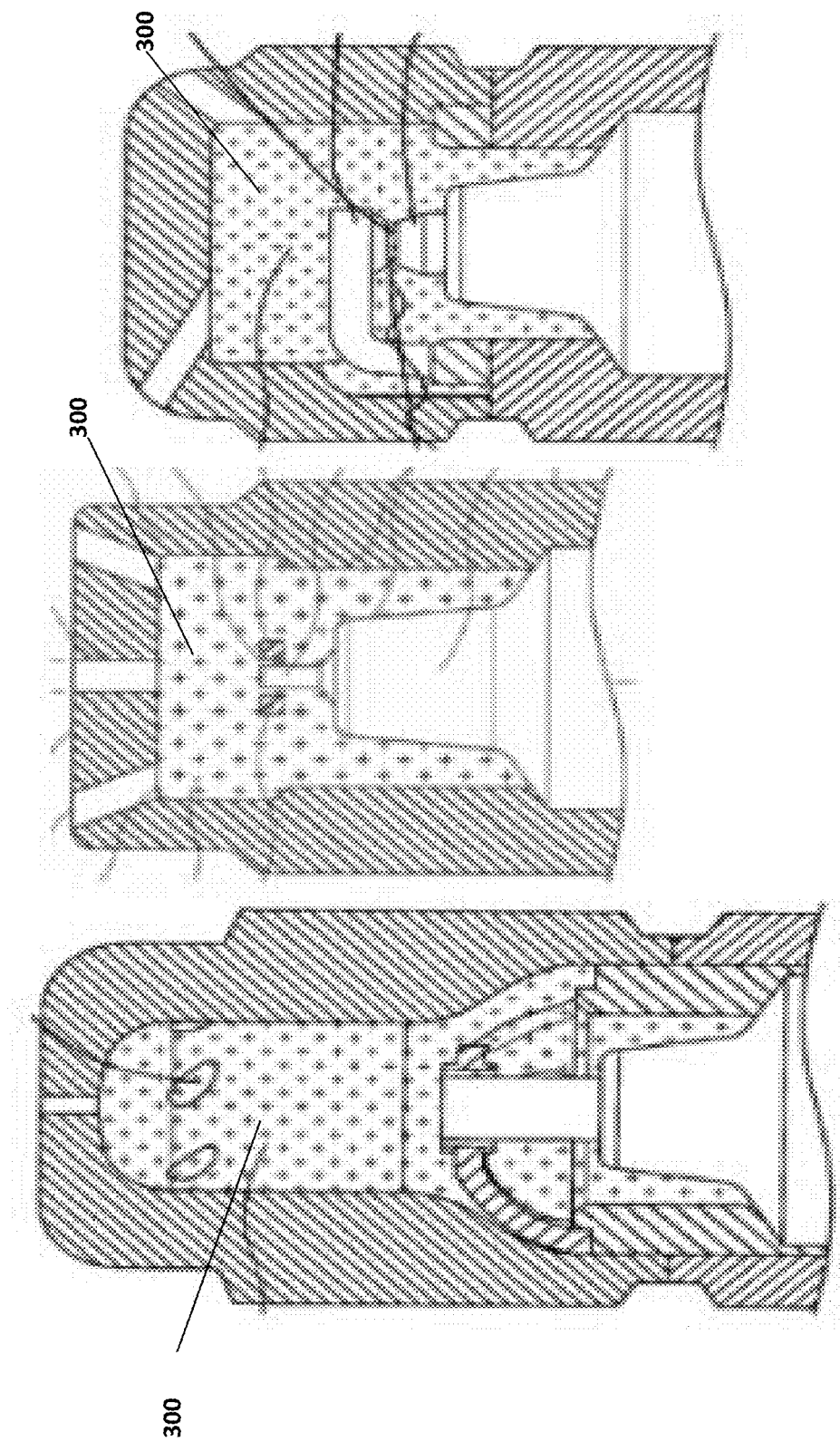
Figure 3 Examples "Total Volume"

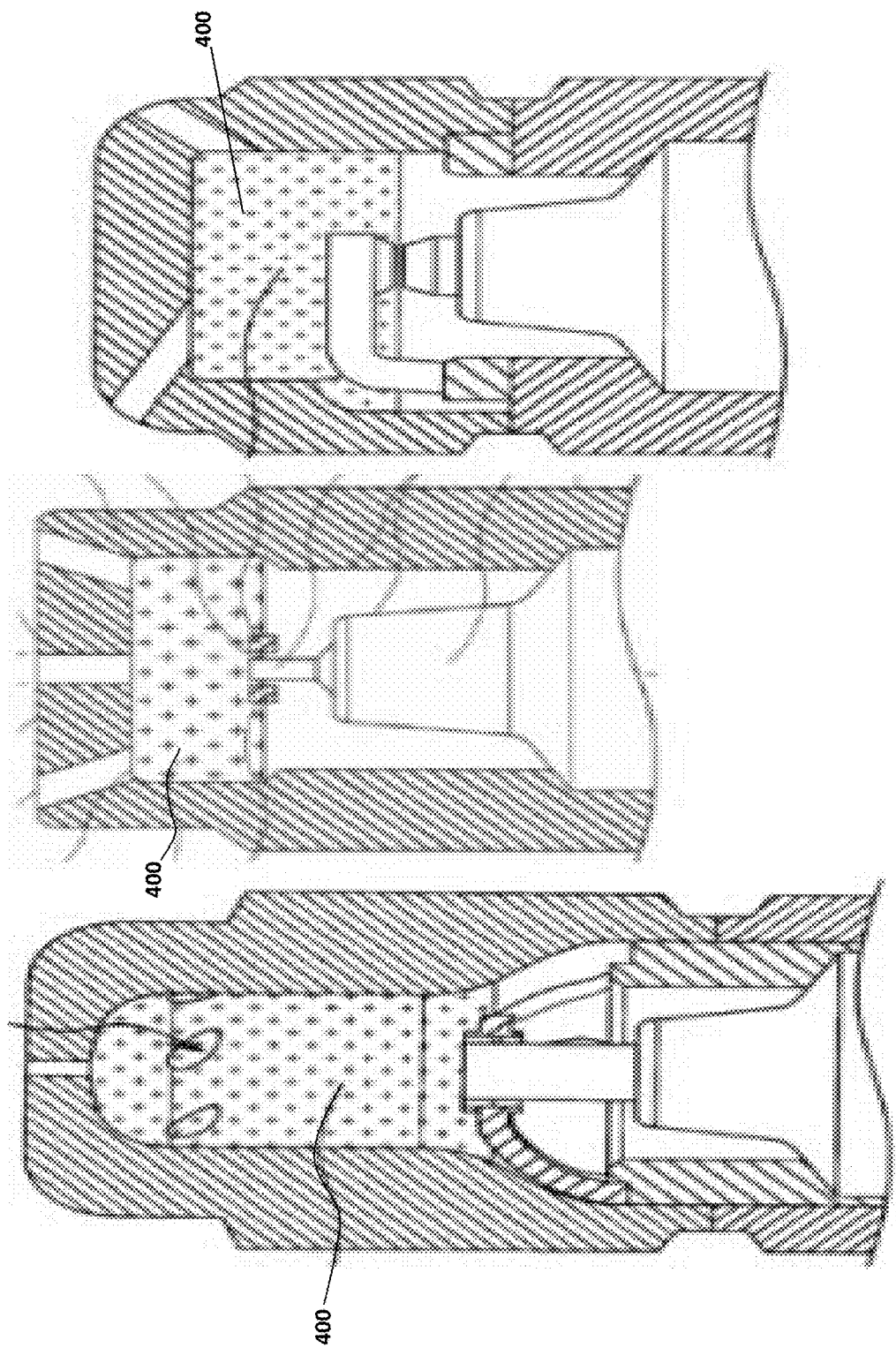
Figure 4. Examples "Volume Ahead of the Gap"

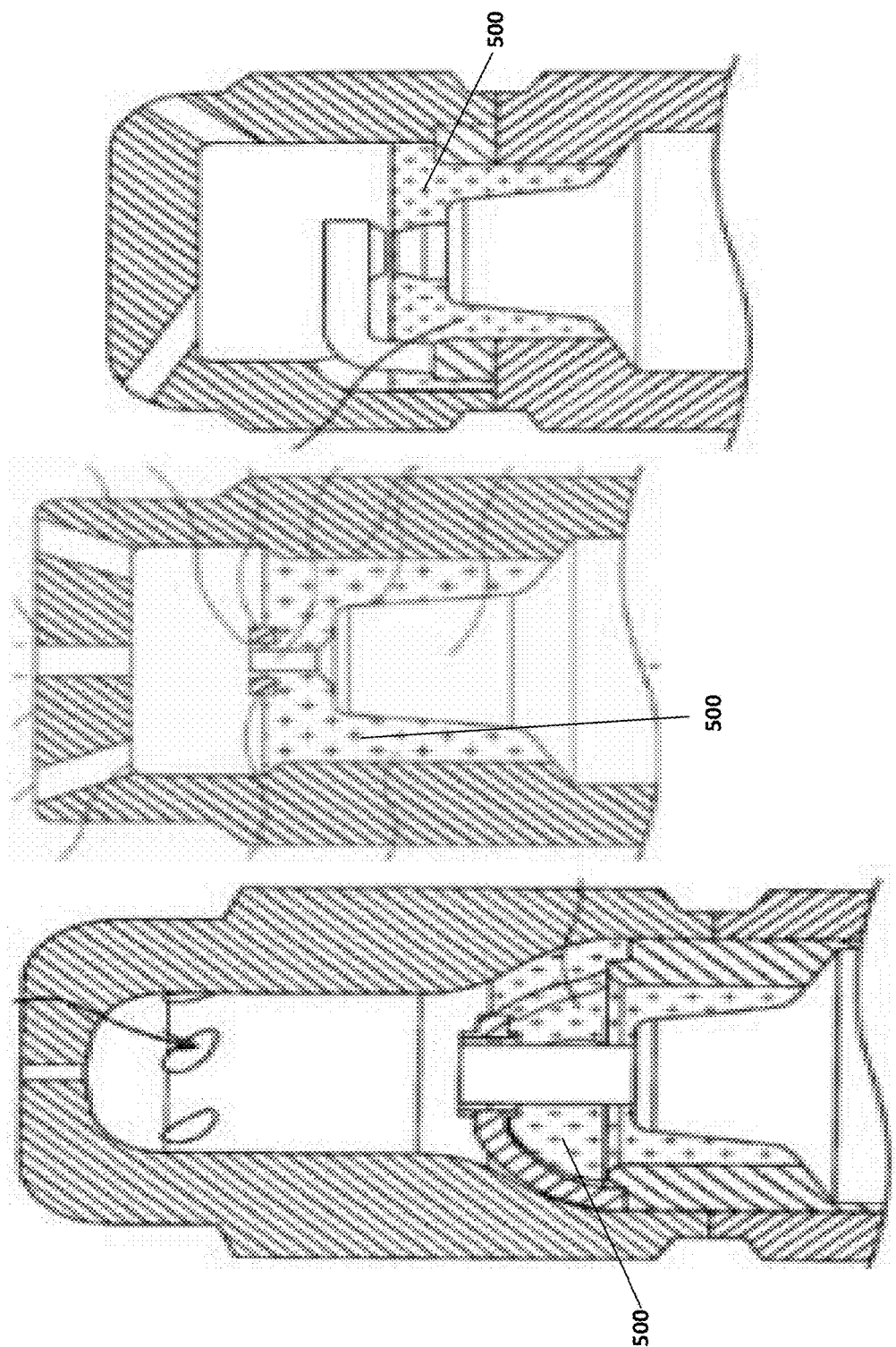
Figure 5. Examples "Volume Behind the Gap"

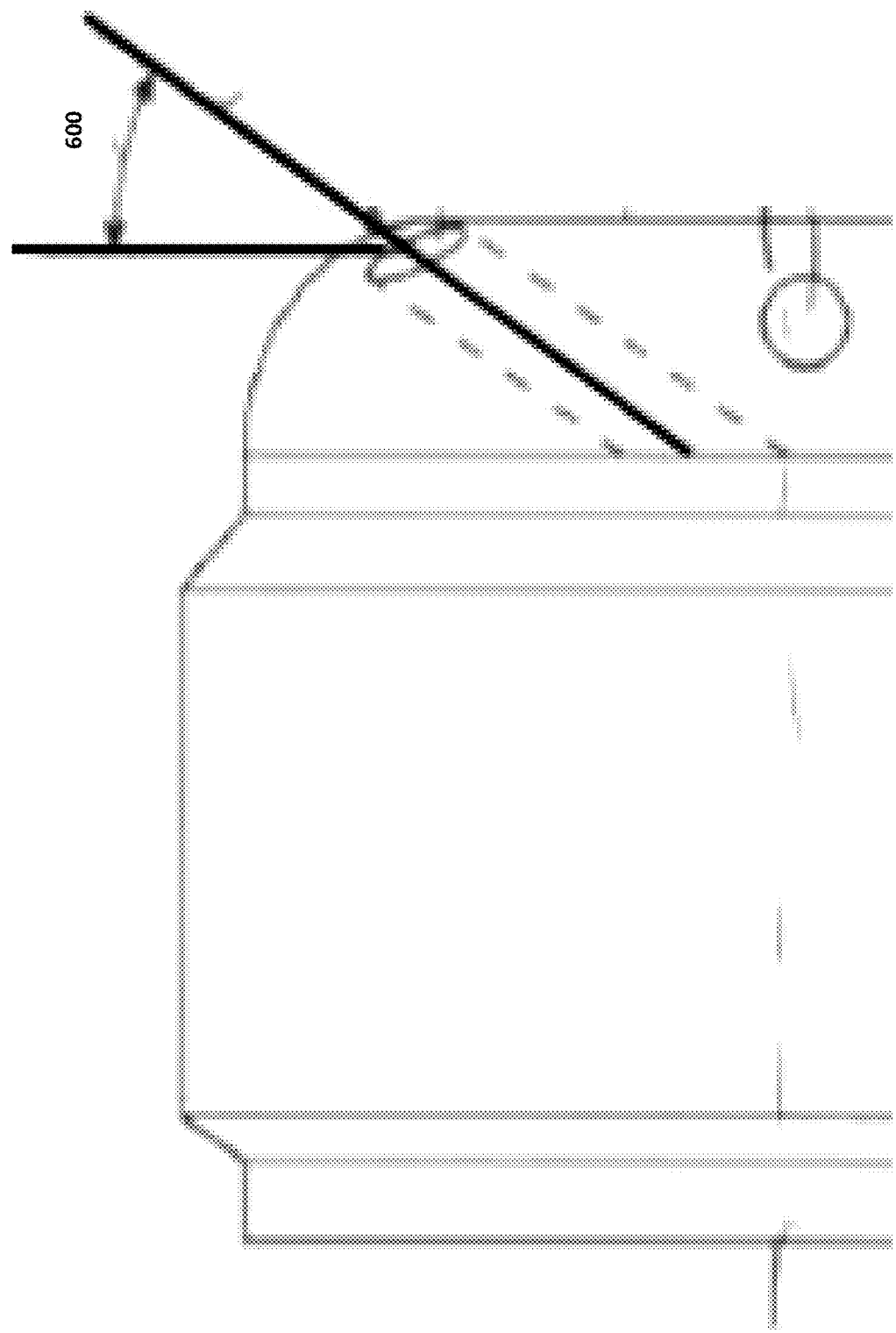
Figure 6. Example "Penetration Angle"

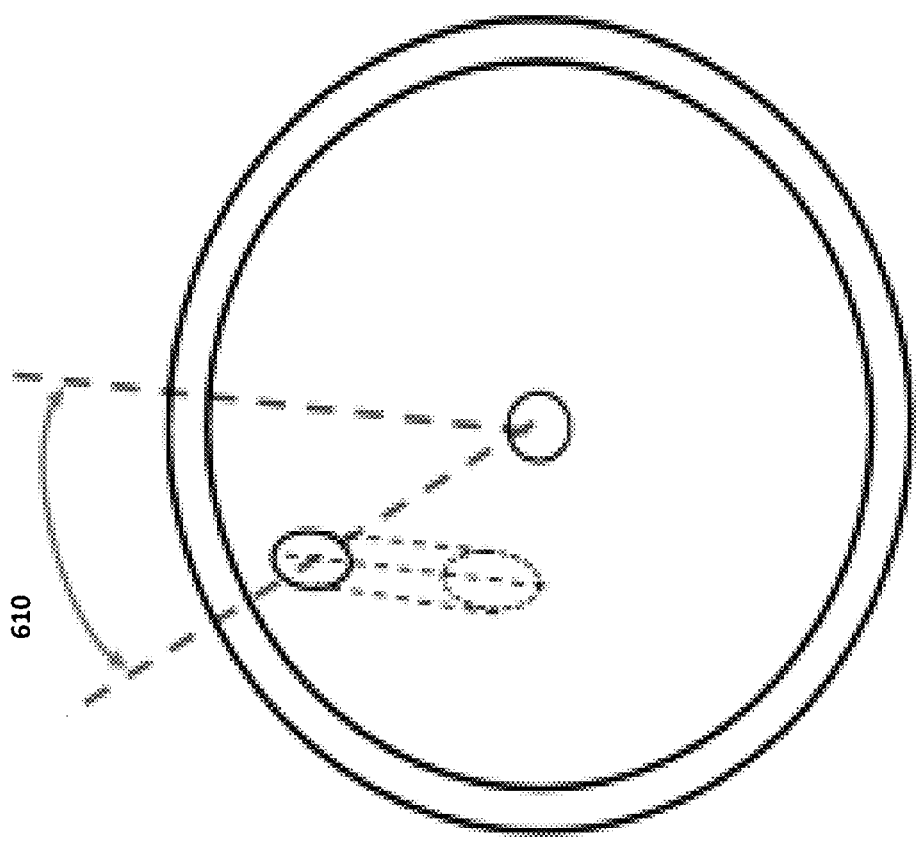
Figure 7. Example "Index Angle"

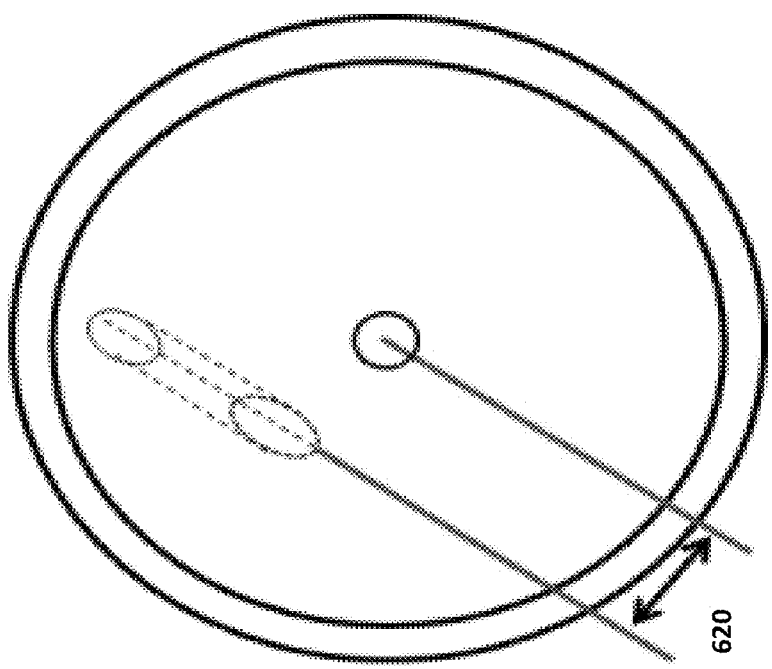
Figure 8. Example "Rotational Offset"

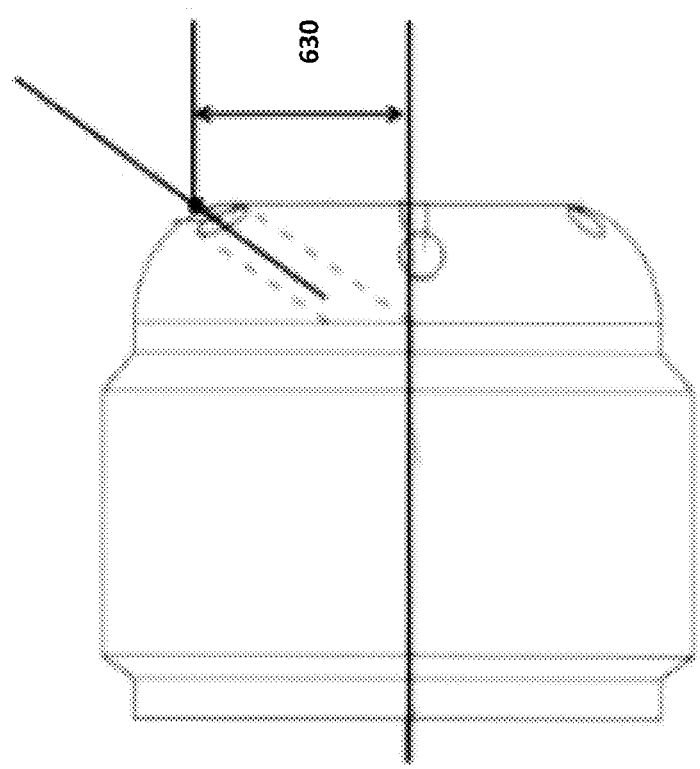
Figure 9. Example "Pattern Radius"

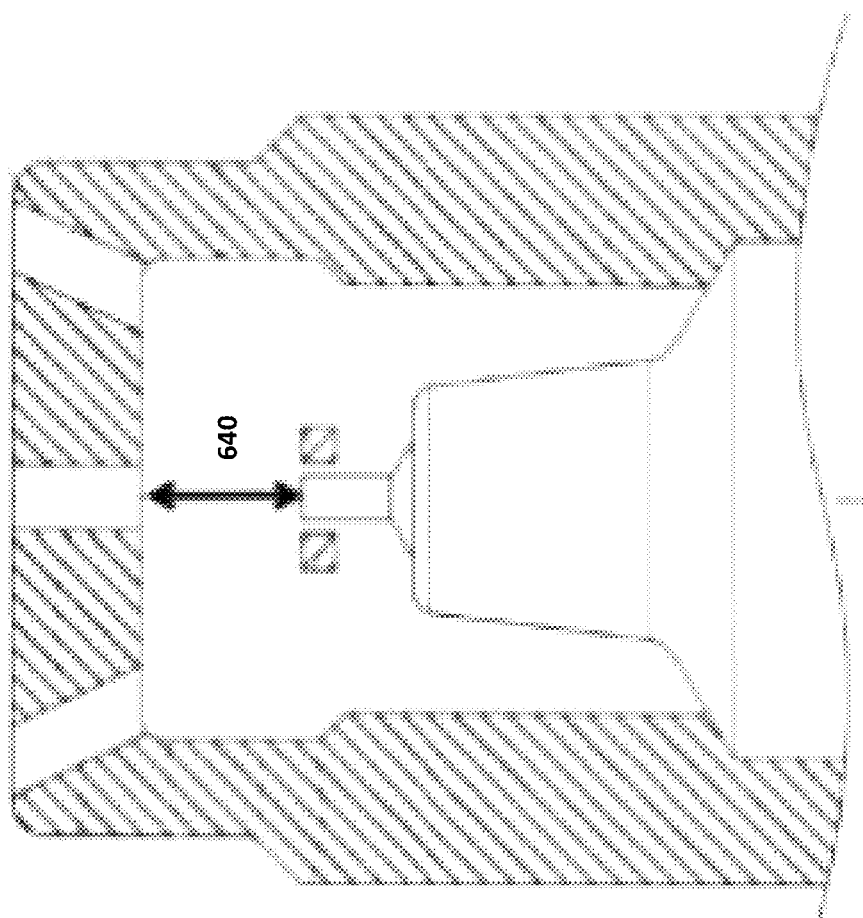
Figure 10. Example "Prechamber Ceiling Distance from Center Electrode"

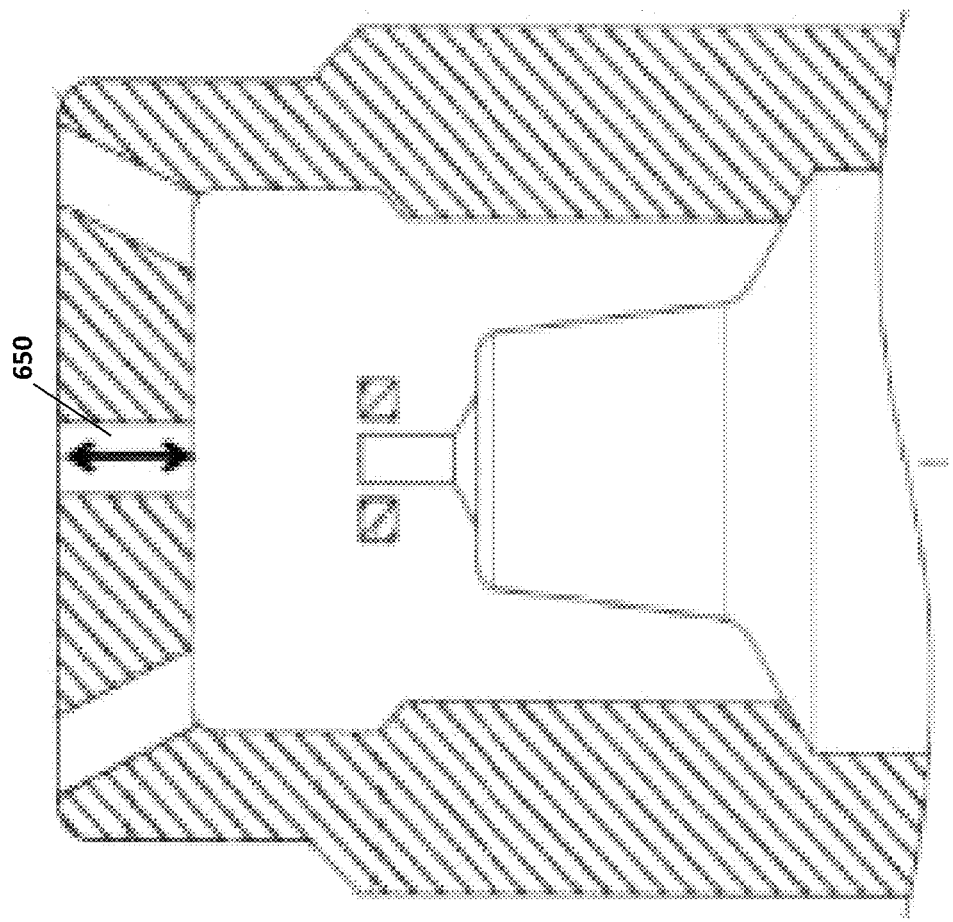
Figure 11. Example "Port Length"

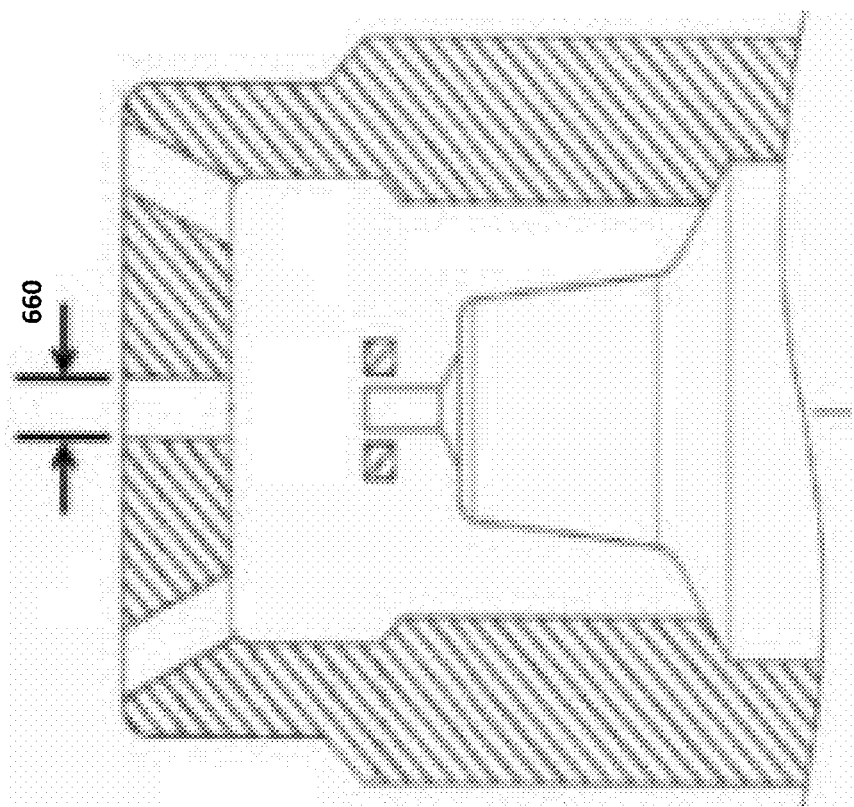
Figure 12. Example "Port Diameter"

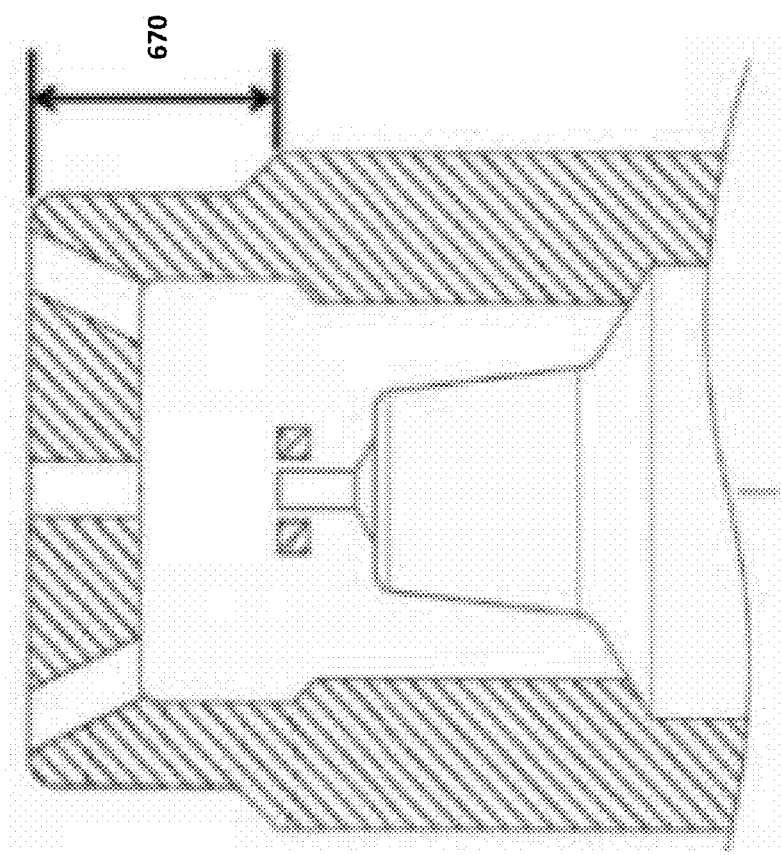
Figure 13. Example "Precombustion Chamber Insertion Depth"

TWO-STAGE PRECOMBUSTION CHAMBER FOR LARGE BORE GAS ENGINES

I. CROSS-REFERENCE TO RELATED APPLICATIONS

This application claims priority of U.S. Patent Application No. 61/697,628, entitled "Two-Stage Precombustion Chamber For Large Bore Gas Engines," and filed Sep. 6, 2012; which is related to U.S. patent application Ser. No. 13/602,148, entitled "Method and apparatus for achieving high power flame jets while reducing quenching and autoignition in prechamber spark plugs for gas engines," and filed on Sep. 1, 2012 and International Patent Application Number PCT/US2012/53568, entitled "Method and apparatus for achieving high power flame jets while reducing quenching and autoignition in prechamber spark plugs for gas engines," and filed on Sep. 1, 2012, both of which claim priority to U.S. Patent Application No. 61/573,290, entitled "Method and apparatus for achieving high power flame jets while reducing quenching and autoignition in prechamber spark plugs for gas engines," and filed on Sep. 3, 2011. This application is also related to International Patent Application Number PCT/US2011/002012, entitled "Prechamber Ignition System," and filed on Dec. 30, 2011, which claims priority to U.S. Patent Application No. 61/460,337, entitled "High efficiency ricochet effect passive chamber spark plug," and filed on Dec. 31, 2010. The entirety of each of the foregoing patent applications is incorporated by reference herein in their entirety.

II. FIELD OF THE INVENTION

The disclosure generally relates to systems and methods for a two-stage precombustion chamber, and more particularly to a two-stage precombustion chamber that reduces NOx emissions in fueled, precombustion chamber gas engines. The two-stage precombustion chamber can be also achieved by simply replacing a conventional spark plug, used with conventional fueled prechamber, with a passive prechamber spark plug.

III. BACKGROUND OF THE INVENTION

Large gas engines with cylinder bore diameter greater than 200 mm typically use fuel-fed, rich precombustion chambers to enhance flame propagation rate with lean air/fuel mixtures in the main combustion chamber. A drawback of this type of system is that a fuel rich prechamber generates very high NOx and even though the main chamber generates very low NOx the combined amount remains higher than the legislated amount.

There is a need to address the foregoing deficiencies in the art.

IV. SUMMARY OF THE INVENTION

In certain embodiments, a two-stage precombustion chamber is disclosed comprising: a first prechamber stage enclosing a first prechamber volume, the first prechamber stage comprising: one or more first stage holes communicating between the first prechamber volume and a second prechamber volume; a primary electrode disposed within the first prechamber volume; and one or more ground electrodes disposed within the first prechamber volume and offset from the primary electrode to form one or more electrode gaps; and a second prechamber stage enclosing the second prechamber volume, the second prechamber stage comprising: one or more second stage holes communicating between the second prechamber volume and a combustion chamber volume. A first fuel concentration in the first prechamber volume may be higher than a second fuel concentration in the second prechamber volume. The first fuel concentration may be higher than the second fuel concentration before a spark is introduced. The first fuel concentration may be at least about 5% higher than the second fuel concentration. The first prechamber volume may be smaller than the second prechamber volume. The first prechamber volume may be less than about 50% of the second prechamber volume. The two-stage precombustion chamber may further comprise a fuel admission point configured to admit fuel into the first prechamber volume. The two-stage precombustion chamber may further comprise a fuel admission point configured to admit fuel into the second prechamber volume. Each of the one or more first stage holes may define a first stage hole axis and each of the one or more second stage holes may define a second stage hole axis and each first stage hole axis and each second stage hole axis may define an index angle, a penetration angle and a rotational offset. The index angle, the penetration angle, the rotational offset of the first stage holes and the second stage holes, the first prechamber volume and aspect-ratio, the second prechamber volume and aspect-ratio, and the location of one or more spark gaps within the first prechamber volume may be selected to generate the first fuel concentration higher than the second fuel concentration. The first stage prechamber may comprises a passive prechamber spark plug with a heat range selected to maintain all surface temperatures of the passive prechamber spark plug below a thermal runaway point dictated by the air-fuel mixture composition and by the level of combustion mean effective pressure at which the engine operates.

In certain embodiments, a two-stage precombustion chamber is disclosed comprising: a first prechamber stage enclosing a first prechamber volume, the first prechamber stage comprising: one or more first stage holes communicating between the first prechamber volume and a second prechamber volume; a primary electrode disposed within the first prechamber volume; and one or more ground electrodes disposed within the first prechamber volume and offset from the primary electrode to form one or more electrode gaps; and a second prechamber stage comprising: an external surface and an internal surface enclosing the second prechamber volume; and one or more second stage holes communicating between the internal surface and the external surface. A first fuel concentration in the first prechamber volume may be higher than a second fuel concentration in the second prechamber volume. The first fuel concentration may be higher than the second fuel concentration before a spark is introduced. The first fuel concentration may be at least about 5% higher than the second fuel concentration. The first prechamber volume may be smaller than the second prechamber volume. The first prechamber volume may be less than about 50% of the second prechamber volume. The two-stage precombustion chamber may further comprise a fuel admission point configured to admit fuel into the first prechamber volume. The two-stage precombustion chamber may further comprise a fuel admission point configured to admit fuel into the second prechamber volume. Each of the one or more first stage holes may define a first stage hole axis and each of the one or more second stage holes may define a second stage hole axis and each first stage hole axis and each second stage hole axis may define an index angle, a penetration angle and a rotational offset. The index angle, the penetration angle, the rotational offset of the first stage holes and the second stage holes, the first prechamber volume and aspect-ratio, the second prechamber volume and aspect-ratio, and the location of one or more spark gaps within the first prechamber volume may be selected to generate the first fuel concentration higher than the second fuel concentration.

In certain embodiments, a method of reducing NOx levels in gas engines is disclosed, comprising: providing a two-stage precombustion chamber comprising: a first prechamber stage enclosing a first prechamber volume, the first prechamber stage comprising: one or more first stage holes communicating between the first prechamber volume and a second prechamber volume; a primary electrode disposed within the first prechamber volume; one or more ground electrodes disposed within the first prechamber volume and offset from the primary electrode to form one or more electrode gaps; and a second prechamber stage enclosing the second prechamber volume, the second prechamber stage comprising: one or more second stage holes communicating between the second prechamber volume and a combustion chamber volume; introducing one or more fuel in-filling streams to a selected one of the first prechamber volume and the second prechamber volume; and generating a spark across at least one of the one or more electrodes gaps to ignite a fuel-air mixture in the first prechamber volume. The first prechamber volume may be smaller than the second prechamber volume. The first prechamber volume may be less than about 50% of the second prechamber volume. The one or more fuel in-filling streams may be introduced into the first prechamber volume. The one or more fuel in-filling streams may be introduced into the second prechamber volume. The first prechamber volume may contain a first fuel-air mixture with a first fuel concentration and the second prechamber volume may contain a second fuel-air mixture with a second fuel concentration and the first fuel concentration may be higher than the second fuel concentration. The first fuel concentration may be higher than the second fuel concentration before the spark is generated. The first fuel concentration may be at least about 5% higher than the second fuel concentration. Each of the one or more first stage holes may define a first stage hole axis and each of the one or more second stage holes may define a second stage hole axis and each first stage hole axis and each second stage hole axis may define an index angle, a penetration angle and a rotational offset. The index angle, the penetration angle, the rotational offset of the first stage holes and the second stage holes, the first prechamber volume and aspect-ratio, the second prechamber volume and aspect-ratio, and the location of one or more spark gaps within the first prechamber volume may be selected to generate a first fuel-air mixture in the first prechamber volume with a higher fuel concentration than a second fuel-air mixture in the second prechamber volume. The method may further comprise providing cooling to the first stage prechamber to maintain all surface temperatures of the first prechamber below a thermal runaway point dictated by the air-fuel mixture composition and by the level of combustion mean effective pressure at which the engine operates. The method may further comprise providing cooling to the second stage prechamber to maintain all surface temperatures of the second prechamber to prevent flame quenching and to promote flame propagation speed as dictated by the air-fuel mixture composition and flow dynamic.

In certain embodiments, a method of reducing NOx levels in gas engines is disclosed, comprising: providing a two-stage precombustion chamber comprising: a first prechamber stage enclosing a first prechamber volume, the first prechamber stage comprising: one or more first stage holes communicating between the first prechamber volume and a second prechamber volume; a primary electrode disposed within the first prechamber volume; one or more ground electrodes disposed within the first prechamber volume and offset from the primary electrode to form one or more electrode gaps; and a second prechamber stage comprising: an external surface and an internal surface enclosing the second prechamber volume; and one or more second stage holes communicating between the internal surface and the external surface; introducing one or more fuel in-filling streams to a selected one of the first prechamber volume and the second prechamber volume; and generating a spark across at least one of the one or more electrodes gaps to ignite a fuel-air mixture in the first prechamber volume. The first prechamber volume may be smaller than the second prechamber volume. The first prechamber volume may be less than about 50% of the second prechamber volume. The one or more fuel in-filling streams may be introduced into the first prechamber volume. The one or more fuel in-filling streams may be introduced into the second prechamber volume. The first prechamber volume may contain a first fuel-air mixture with a first fuel concentration and the second prechamber volume may contain a second fuel-air mixture with a second fuel concentration and the first fuel concentration may be higher than the second fuel concentration. The first fuel concentration may be higher than the second fuel concentration before the spark is generated. The first fuel concentration may be at least about 5% higher than the second fuel concentration. Each of the one or more first stage holes may define a first stage hole axis and each of the one or more second stage holes may define a second stage hole axis and each first stage hole axis and each second stage hole axis may define an index angle, a penetration angle and a rotational offset. The index angle, the penetration angle, the rotational offset of the first stage holes and the second stage holes, the first prechamber volume and aspect-ratio, the second prechamber volume and aspect-ratio, the separate fueling and the location of one or more spark gaps within the first prechamber volume may be selected to generate a first fuel-air mixture in the first prechamber volume with a higher fuel concentration than a second fuel-air mixture in the second prechamber volume.

In certain embodiments, a method is disclosed for controlling the admission of fuel to a two-stage precombustion chamber utilizing an electrically actuated valve, comprising adjusting a quantity of fuel admitted and timing of admitting the quantity of fuel relative to engine position to achieve a desired fuel distribution in the two-stage precombustion chamber. At least one of the quantity of fuel and the timing of admitting the fuel may be adjusted utilizing a closed feedback loop based on one or more previous operating cycles and wherein the feedback loop includes feedback generated from the two-stage precombustion chamber or the main combustion chamber.

In certain embodiments, a method is disclosed for controlling and adjusting the characteristics of a spark discharge event within a two-stage precombustion chamber, comprising utilizing an electronically controlled ignition system to adjust the characteristics of a spark discharge event based the fuel distribution present two-stage precombustion chamber. The characteristics of the spark discharge may be adjusted utilizing a closed feedback loop based on one or more previous operating cycles and wherein the feedback loop includes feedback generated from the two-stage precombustion chamber or the main combustion chamber.

V. BRIEF DESCRIPTION OF THE DRAWINGS

FIG. 1 depicts two variations of a two-stage precombustion chamber in accordance with certain embodiments.

FIG. 2 depicts an exemplary comparison of NOx output between a conventional precombustion chamber with a conventional spark plug and a two-stage precombustion chamber with a passive prechamber spark plug in accordance with certain embodiments.

FIG. 3 depicts the total volume of certain embodiments of a passive prechamber spark plug, which may be used as the first stage in a two-stage precombustion chamber in accordance with certain embodiments.

FIG. 4 depicts the volume ahead of the gap of certain embodiments of a passive prechamber spark plug, which may be used as the first stage in a two-stage precombustion chamber in accordance with certain embodiments.

FIG. 5 depicts the volume behind the gap of certain embodiments of a passive prechamber spark plug, which may be used as the first stage in a two-stage precombustion chamber in accordance with certain embodiments.

FIG. 6 depicts an exemplary penetration angle of a passive prechamber spark plug which may be used as the first stage in a two-stage precombustion chamber in accordance with certain embodiments.

FIG. 7 depicts an exemplary index angle of a passive prechamber spark plug, which may be used as the first stage in a two-stage precombustion chamber in accordance with certain embodiments.

FIG. 8 depicts an exemplary rotational offset of a passive prechamber spark plug, which may be used as the first stage in a two-stage precombustion chamber in accordance with certain embodiments.

FIG. 9 depicts an exemplary pattern radius of a passive prechamber spark plug, which may be used as the first stage in a two-stage precombustion chamber in accordance with certain embodiments.

FIG. 10 depicts an exemplary prechamber ceiling distance from center electrode of a passive prechamber spark plug, which may be used as the first stage in a two-stage precombustion chamber in accordance with certain embodiments.

FIG. 11 depicts an exemplary port length of a passive prechamber spark plug, which may be used as the first stage in a two-stage precombustion chamber in accordance with certain embodiments.

FIG. 12 depicts an exemplary port diameter of a passive prechamber spark plug, which may be used as the first stage in a two-stage precombustion chamber in accordance with certain embodiments.

FIG. 13 depicts an exemplary precombustion chamber insertion depth of a passive prechamber spark plug, which may be used as the first stage in a two-stage precombustion chamber in accordance with certain embodiments.

VI. DETAILED DESCRIPTION

In certain embodiments, the two-stage precombustion chamber 100 concept disclosed herein, may be used to reduce engine NOx levels, with fueled precombustion chambers, while maintaining comparable engine power output and thermal efficiency.

Certain embodiments provide a method and a structure to achieve more effective combustion with leaner mixtures resulting in lower NOx. In certain embodiments as shown in FIG. 1, conventional precombustion chambers may be modified so that a first stage of combustion 110 occurs in a relatively small volume, with a relatively fuel rich mixture 170, and a second stage of combustion 120 occurs in a relatively larger volume with a relatively fuel lean mixture 150. In certain embodiments, a more efficient overall combustion characterized by low levels of NOx formation can be achieved by the two-stage precombustion chamber 100 system while generating very high energy flame jets 140 emerging from the second prechamber stage 120 into the main combustion chamber 110.

In certain embodiments the two-stage prechamber 100 system can be achieved by simply replacing a conventional spark plug, used in fueled prechamber, with a passive prechamber spark plug to provide for the first stage prechamber 110 in the two-stage precombustion chamber 100 system.

The amount of NOx produced in a prechamber may be mainly dictated by the air-fuel ratio and by the volume of reactants. As the volume of reactants at the lower air-fuel ratio is decreased, the amount of NOx formed may be proportionally reduced. In certain embodiments, with the 2-stage precombustion, the volume of the fuel rich 170 stage can be reduced by at least a factor of 2, thereby reducing NOx production by approximately a factor of 2. In certain embodiments, the flame jet energy also may be dictated by the air-fuel ratio and by the volume of reactants. As the volume of reactants at the lower air-fuel ratio is decreased, the flame jet energy also may be reduced. In certain embodiments with the two-stage precombustion 100, the second prechamber stage 120, characterized by a relatively leaner mixture 150, is ignited by powerful flame jets 140 emerging from the relatively fuel rich 170 first prechamber 110 stage. The ignition by powerful flame jets 140 may result in a fast combustion of the leaner mixture 150 in the second prechamber stage 120, which may generate high energy flame jets 140 from the second prechamber stage 120. These high energy flame jets 140 may ignite the lean air fuel mixture 150 in the engine main combustion chamber 120 and achieve low overall NOx emissions, while maintaining comparable engine power output and thermal efficiency to a system employing a conventional precombustion chamber.

In certain embodiments as shown in FIG. 1, the volume of the first prechamber stage 110 may be substantially smaller than the volume of the second prechamber stage 120. The volume of the first prechamber stage 110 may be less than about 50% of the volume of the second prechamber stage 120.

In certain embodiments, either the first prechamber stage 110 or the second prechamber stage 120 can be fueled directly by a separate fuel line. In FIG. 1, higher fuel concentration is depicted by a darker blue fill color. In certain embodiments, if the first prechamber stage 110 is fueled directly by a separate fuel admission point 130 as shown in the top two figures of FIG. 1, a richer first fuel concentration in the first prechamber 110 stage may result than if the second prechamber 120 stage is fueled directly by a separate fuel admission point 130 than as shown in the bottom two figures of FIG. 1. Conversely, a second fuel concentration in the second prechamber 120 stage may be leaner if the first prechamber 110 stage is fuel directly by a separate fuel admission point 130 as shown in the top two figures of FIG. 1 than if the second prechamber 120 stage is fueled directly by a separate fuel admission point 130 than as shown in the bottom two figures of FIG. 1. Performance may be improved in comparison to conventional single stage precombustion chambers by either fueling the first prechamber 110 stage or the second prechamber 120 stage directly. In certain embodiments, a passive prechamber (PPC) spark plug may be used as the first prechamber 110 stage. In certain embodiments, a fuel-fed second prechamber 120 stage may be used in conjunction with a PPC spark plug as the first prechamber stage 110. Exemplary non-limiting examples of PPC spark plugs are disclosed in related U.S. patent application Ser. No. 13/602,148 and International Patent Application Numbers PCT/US2012/53568 and PCT/US2011/002012, which are incorporated by reference herein.

In certain embodiments, the communication between the first prechamber 110 stage, the second prechamber 120 stage and the main combustion chamber may occur through one or more holes with a predetermined relative pattern and angles. In certain embodiments, the one or more holes may include one or more first stage holes 115 for communicating between the first prechamber 110 stage and the second prechamber 120 stage and one or more second stage holes 125 for communicating between the second prechamber 120 stage and the main combustion chamber. In certain embodiments, each of the one or more first stage holes 115 may define a first stage hole axis 160 and each of the one or more second stage holes 125 may define a second stage hole axis 160. Each first stage hole axis 160 and each second stage hole axis 160 may define an index angle 610, a penetration angle 600 and a rotational offset 620. The index angle 610, the penetration angle 600 and the rotational offset 620 of the first stage holes 115 and the second stage holes 125 may be selected to generate a first fuel concentration in the first prechamber 110 stage that is higher than a second fuel concentration in the second prechamber stage 120. In certain embodiments, the volumes and aspect ratios of the two prechamber stages, along with the location of the electrodes within the first stage prechamber 110, the hole patterns, angles and the separate fueling, may be selected to create a first fuel concentration in the first prechamber 110 stage that is substantially higher than a second fuel concentration in the second prechamber 120 stage.

FIG. 2 show exemplary results for reduction of NOx output achieved with a two-stage precombustion chamber system 100 with a PPC spark plug as compared to a conventional precombustion chamber with a conventional spark plug. The results shown in the FIG. 2 demonstrate that lower NOx emissions were achieved without penalty in engine thermal efficiency with this non-optimized system. Therefore, there is a great potential for an optimized two-stage precombustion chamber system 100 with a PPC spark plug, to achieve stable operation with leaner mixtures in the precombustion chamber resulting in very low NOx emissions, much below the 0.5 g/bhp-hr level.

In certain embodiments, the physical parameters shown in FIGS. 3-13 may be varied alone or in combination to vary the first fuel concentration in the first prechamber 110 stage and the second fuel concentration in the second prechamber 120 stage to result in a higher first fuel concentration than the second fuel concentration.

As shown in FIG. 3, Total Volume 300 may be defined as the volume of air inside the prechamber spark plug not including the volume of the ports/holes.

As shown in FIG. 4, Volume Ahead of the Gap 400 may be defined as the volume of air inside the prechamber spark plug from the center of the gap to the endcap not including the volume of the ports/holes.

As shown in FIG. 5, Volume Behind the Gap 500 may be defined as the volume of air inside the prechamber spark plug between the center of the gap and the rear of the prechamber not including the volume of any ports/holes that may be at the rear of the prechamber.

As shown in FIG. 6, the Penetration Angle 600 may be defined as the angle between the plane perpendicular to the axis 160 of the prechamber spark plug and the centerline of the port/hole.

As shown in FIG. 7, the Index Angle 610 may be defined as the angle of rotation about the axis 160 of the prechamber spark plug and the location on the port where the centerline of the port meets the front plane of the prechamber spark plug.

As shown in FIG. 8, Rotational Offset 620 may be defined as the perpendicular distance between the axis 160 of the prechamber spark plug and the centerline of the port/hole (measured on the plane at the front of the prechamber spark plug).

As shown in FIG. 9, the Pattern Radius 630 may be defined as the perpendicular distance from the axis 160 of the prechamber spark plug to the centerline of the port/hole, measured at the front plane of the endcap.

As shown in FIG. 10, the Prechamber Ceiling Distance 640 from the Center Electrode may be defined as the distance along the axis 160 of the prechamber spark plug from the top of the center electrode to the inside of the endcap.

As shown in FIG. 11, the Port Length 650 may be defined as the length of the port/hole, measured along the centerline of the port/hole, from the inside of the endcap to the outside of the endcap.

As shown in FIG. 12, the Port Diameter 660 may be defined as the diameter of the port/hole.

As shown in FIG. 13, the Precombustion Chamber Insertion Depth 670 may be defined as the distance from the firing deck to the end of the prechamber spark plug. As shown, FIG. 9 assumes that the firing deck is located at the end of the threads.

We claim:
1. A two-stage precombustion chamber comprising:
   a first prechamber stage enclosing a first prechamber volume, the first prechamber stage comprising:
      one or more first stage holes communicating between the first prechamber volume and a second prechamber volume;
      a primary electrode disposed within the first prechamber volume; and
      one or more ground electrodes disposed within the first prechamber volume and offset from the primary electrode to form one or more electrode gaps; and
   a second prechamber stage enclosing the second prechamber volume, the second prechamber stage comprising:
      one or more second stage holes communicating between the second prechamber volume and a combustion chamber volume; and
      a fuel admission point configured to admit fuel into the second prechamber volume.

2. The two-stage precombustion chamber of claim 1, wherein a first fuel concentration in the first prechamber volume is higher than a second fuel concentration in the second prechamber volume.

3. The two-stage precombustion chamber of claim 2, wherein the first fuel concentration is higher than the second fuel concentration before a spark is introduced.

4. The two-stage precombustion chamber of claim 2, wherein the first fuel concentration is at least about 5% higher than the second fuel concentration.

5. The two-stage precombustion chamber of claim 1, wherein the first prechamber volume is smaller than the second prechamber volume.

6. The two-stage precombustion chamber of claim 1, wherein the first prechamber volume is less than about 50% of the second prechamber volume.

7. The two-stage precombustion chamber of claim 1, further comprising a fuel admission point configured to admit fuel into the first prechamber volume.

8. The two-stage precombustion chamber of claim 1, wherein each of the one or more first stage holes defines a first stage hole axis and each of the one or more second stage holes defines a second stage hole axis and wherein each first stage hole axis and each second stage hole axis defines an index angle, a penetration angle and a rotational offset.

9. The two-stage precombustion chamber of claim 8, wherein the index angle, the penetration angle and the rotational offset of the first stage holes and the second stage holes are selected to generate a first fuel concentration in the first prechamber volume that is higher than a second fuel concentration in the second prechamber volume.

10. The two-stage precombustion chamber of claim 1, wherein the first stage prechamber comprises a passive prechamber spark plug with a heat range selected to maintain all surface temperatures of the passive prechamber spark plug below a thermal runaway point dictated by the air-fuel mixture composition and by the level of combustion mean effective pressure at which the engine operates.

11. A two-stage precombustion chamber comprising:
a first prechamber stage enclosing a first prechamber volume, the first prechamber stage comprising:
one or more first stage holes communicating between the first prechamber volume and a second prechamber volume;
a primary electrode disposed within the first prechamber volume; and
one or more ground electrodes disposed within the first prechamber volume and offset from the primary electrode to form one or more electrode gaps; and
a second prechamber stage comprising:
an external surface and an internal surface enclosing the second prechamber volume;
one or more second stage holes communicating between the internal surface and the external surface; and
a fuel admission point configured to admit fuel into the second prechamber volume.

12. The two-stage precombustion chamber of claim 11, wherein a first fuel concentration in the first prechamber volume is higher than a second fuel concentration in the second prechamber volume.

13. The two-stage precombustion chamber of claim 12, wherein the first fuel concentration is higher than the second fuel concentration before a spark is introduced.

14. The two-stage precombustion chamber of claim 12, wherein the first fuel concentration is at least about 5% higher than the second fuel concentration.

15. The two-stage precombustion chamber of claim 11, wherein the first prechamber volume is smaller than the second prechamber volume.

16. The two-stage precombustion chamber of claim 11, wherein the first prechamber volume is less than about 50% of the second prechamber volume.

17. The two-stage precombustion chamber of claim 11, further comprising a fuel admission point configured to admit fuel into the first prechamber volume.

18. The two-stage precombustion chamber of claim 11, wherein each of the one or more first stage holes defines a first stage hole axis and each of the one or more second stage holes defines a second stage hole axis and wherein each first stage hole axis and each second stage hole axis defines an index angle, a penetration angle and a rotational offset.

19. The two-stage precombustion chamber of claim 18, wherein the index angle, the penetration angle and the rotational offset of the first stage holes and the second stage holes are selected to generate a first fuel concentration in the first prechamber volume that is higher than a second fuel concentration in the second prechamber volume.

20. A method of reducing NOx levels in gas engines, comprising:
providing a two-stage precombustion chamber comprising:
a first prechamber stage enclosing a first prechamber volume, the first prechamber stage comprising:
one or more first stage holes communicating between the first prechamber volume and a second prechamber volume;
a primary electrode disposed within the first prechamber volume;
one or more ground electrodes disposed within the first prechamber volume and offset from the primary electrode to form one or more electrode gaps; and
a second prechamber stage enclosing the second prechamber volume, the second prechamber stage comprising:
one or more second stage holes communicating between the second prechamber volume and a combustion chamber volume;
introducing one or more fuel admission points into the second prechamber volume; and
generating a spark across at least one of the one or more electrodes gaps to ignite a fuel-air mixture in the first prechamber volume.

21. The method of claim 20, wherein the first prechamber volume is smaller than the second prechamber volume.

22. The method of claim 20, wherein the first prechamber volume is less than about 50% of the second prechamber volume.

23. The method of claim 20, further comprising introducing one or more fuel admission points into the first prechamber volume.

24. The method of claim 20, wherein the first prechamber volume contains a first fuel-air mixture with a first fuel concentration and the second prechamber volume contains a second fuel-air mixture with a second fuel concentration and wherein the first fuel concentration is higher than the second fuel concentration.

25. The method of claim 24, wherein the first fuel concentration is higher than the second fuel concentration before the spark is generated.

26. The method of claim 24, wherein the first fuel concentration is at least about 5% higher than the second fuel concentration.

27. The method of claim 20, wherein each of the one or more first stage holes defines a first stage hole axis and each of the one or more second stage holes defines a second stage hole axis and wherein each first stage hole axis and each second stage hole axis defines an index angle, a penetration angle and a rotational offset.

28. The method of claim 27, wherein the index angle, the penetration angle and the rotational offset of the first stage holes and the second stage holes are selected to generate a first fuel-air mixture in the first prechamber volume with a higher fuel concentration than a second fuel-air mixture in the second prechamber volume.

29. The method of claim 20, further comprising:
providing cooling to the first stage prechamber to maintain all surface temperatures of the first prechamber below a thermal runaway point dictated by the air-fuel mixture composition and by the level of combustion mean effective pressure at which the engine operates.

30. The method of claim 20, further comprising:
providing cooling to the second stage prechamber to maintain all surface temperatures of the second prechamber to prevent flame quenching and to promote flame propagation speed as dictated by the air-fuel mixture composition and flow dynamic.

31. A method of reducing NOx levels in gas engines, comprising:
providing a two-stage precombustion chamber comprising:
a first prechamber stage enclosing a first prechamber volume, the first prechamber stage comprising:
one or more first stage holes communicating between the first prechamber volume and a second prechamber volume;
a primary electrode disposed within the first prechamber volume;
one or more ground electrodes disposed within the first prechamber volume and offset from the primary electrode to form one or more electrode gaps; and
a second prechamber stage comprising:
an external surface and an internal surface enclosing the second prechamber volume; and
one or more second stage holes communicating between the internal surface and the external surface;
introducing one or more fuel in-filling streams to a selected one of the first prechamber volume and the second prechamber volume; and
generating a spark across at least one of the one or more electrodes gaps to ignite a fuel-air mixture in the first prechamber volume;
wherein the one or more fuel admission points is introduced into the second prechamber volume.

32. The method of claim 31, wherein the first prechamber volume is smaller than the second prechamber volume.

33. The method of claim 31, wherein the first prechamber volume is less than about 50% of the second prechamber volume.

34. The method of claim 31, further comprising introducing one or more fuel admission points into the first prechamber volume.

35. The method of claim 31, wherein the first prechamber volume contains a first fuel-air mixture with a first fuel concentration and the second prechamber volume contains a second fuel-air mixture with a second fuel concentration and wherein the first fuel concentration is higher than the second fuel concentration.

36. The method of claim 35, wherein the first fuel concentration is higher than the second fuel concentration before the spark is generated.

37. The method of claim 35, wherein the first fuel concentration is at least about 5% higher than the second fuel concentration.

38. The method of claim 31, wherein each of the one or more first stage holes defines a first stage hole axis and each of the one or more second stage holes defines a second stage hole axis and wherein each first stage hole axis and each second stage hole axis defines an index angle, a penetration angle and a rotational offset.

39. The method of claim 38, wherein the index angle, the penetration angle and the rotational offset of the first stage holes and the second stage holes are selected to generate a first fuel-air mixture in the first prechamber volume with a higher fuel concentration than a second fuel-air mixture in the second prechamber volume.

40. A method for controlling the admission of fuel to a two-stage precombustion chamber utilizing an electrically actuated valve, comprising adjusting a quantity of fuel admitted and timing of admitting the quantity of fuel relative to engine position to achieve a desired fuel distribution in the two-stage precombustion chamber; wherein at least one of the quantity of fuel and the timing of admitting the fuel is adjusted utilizing a closed feedback loop based on one or more previous operating cycles and wherein the feedback loop includes feedback generated from the two-stage precombustion chamber or the main combustion chamber.

41. A method for controlling and adjusting the characteristics of a spark discharge event within a two-stage precombustion chamber, comprising utilizing an electronically controlled ignition system to adjust the characteristics of a spark discharge event based on the fuel distribution present in the two-stage precombustion chamber.

42. The method of claim 41, wherein the characteristics of the spark discharge are adjusted utilizing a closed feedback loop based on one or more previous operating cycles and wherein the feedback loop includes feedback generated from the two-stage precombustion chamber or the main combustion chamber.

* * * * *